United States Patent [19]

Hamby

[11] Patent Number: 4,733,146

[45] Date of Patent: Mar. 22, 1988

[54] ENERGY RECOVERY SYSTEM FOR CYCLIC DRIVES

[75] Inventor: Russell S. Hamby, River Bend, N.C.

[73] Assignee: Reliance Electric Company, Cleveland, Ohio

[21] Appl. No.: 942,027

[22] Filed: Dec. 15, 1986

Related U.S. Application Data

[63] Continuation of Ser. No. 669,946, Nov. 9, 1984, abandoned.

[51] Int. Cl.$^4$ .............................. H02J 9/04; B66B 5/00
[52] U.S. Cl. ...................................... 318/393; 318/807; 318/375; 318/376; 318/373; 187/119; 363/137; 363/138
[58] Field of Search ............................. 318/258–263, 318/269, 331, 341, 139, 345 R, 345 C, 345 CA, 345 B, 345 AB, 345 D, 345 F, 345 G, 356, 357, 358, 364, 374, 375, 376, 377, 385, 387, 391, 392, 393, 410, 408, 405, 404, 406, 407, 400, 417, 416, 430, 431, 432, 433, 434, 341, 803, 807, 806; 363/37, 48, 34, 87, 129, 124, 138; 187/104–120

[56] References Cited

U.S. PATENT DOCUMENTS

| | | | |
|---|---|---|---|
| 3,427,520 | 2/1969 | Oppedahl | 318/294 X |
| 3,475,669 | 10/1969 | Oltendorf | 318/373 X |
| 3,538,404 | 11/1970 | Risberg | 318/376 X |
| 3,579,065 | 5/1971 | Laukaitis | 318/341 X |
| 3,601,683 | 8/1971 | Brown | 363/138 |
| 3,612,973 | 10/1971 | Kuniyoshi | 363/137 X |
| 3,630,304 | 12/1971 | Sahinkaya | 318/308 X |
| 3,660,738 | 5/1972 | Anderson et al. | 318/345 C X |
| 3,661,428 | 5/1972 | Sharp | 320/1 X |
| 3,728,599 | 4/1973 | Minami | 318/376 X |
| 3,863,123 | 1/1975 | Godard et al. | 307/64 X |
| 3,890,551 | 6/1975 | Plunkett | 318/376 |
| 3,940,669 | 2/1976 | Tsuboi et al. | 363/137 X |
| 4,010,407 | 3/1977 | Lombard | 318/87 X |
| 4,066,940 | 1/1978 | Henderson | 318/294 |
| 4,189,668 | 2/1980 | Willcock et al. | 318/375 X |
| 4,191,914 | 3/1980 | Lecluse | 318/139 |
| 4,284,938 | 8/1981 | Bailey | 318/345 G X |
| 4,319,177 | 3/1982 | Kawada et al. | 318/803 X |
| 4,330,742 | 5/1982 | Reimers | 318/139 X |
| 4,375,612 | 3/1983 | Wirth | 363/48 X |
| 4,381,479 | 4/1983 | Wesling et al. | 318/317 |
| 4,384,240 | 5/1983 | Sloan | 318/139 X |
| 4,388,573 | 6/1983 | Horiuchi et al. | 318/269 X |
| 4,426,610 | 1/1984 | Kawada et al. | 318/806 X |
| 4,443,744 | 4/1984 | Konrad | 318/269 |
| 4,447,868 | 5/1984 | Turnbull | 363/87 X |
| 4,471,277 | 9/1984 | Franz | 318/345 C X |
| 4,478,315 | 10/1984 | Nomura | 187/29 R |
| 4,479,080 | 10/1984 | Lambert | 318/139 X |
| 4,545,464 | 10/1985 | Nomura | 187/29 R |
| 4,548,299 | 10/1985 | Nomura | 307/66 X |
| 4,554,999 | 11/1985 | Kamaike | 318/376 X |

Primary Examiner—William M. Shoop, Jr.
Assistant Examiner—Paul Ip
Attorney, Agent, or Firm—James A. Hudak

[57] ABSTRACT

A system is disclosed for recovering and storing the energy generated by an electrical motor during deceleration so as to be available for use when the motor is subsequently accelerated. The system utilizes a capacitor for storing the energy produced by voltage regeneration of the motor when decelerating. A two-quadrant regulator, connected between a three-phase rectifier and a four-quadrant SCR regulator, controls the charging and discharging of the capacitor so that the energy stored therein is proportional to the energy required to accelerate the motor and load to the maximum rotational velocity required.

8 Claims, 1 Drawing Figure

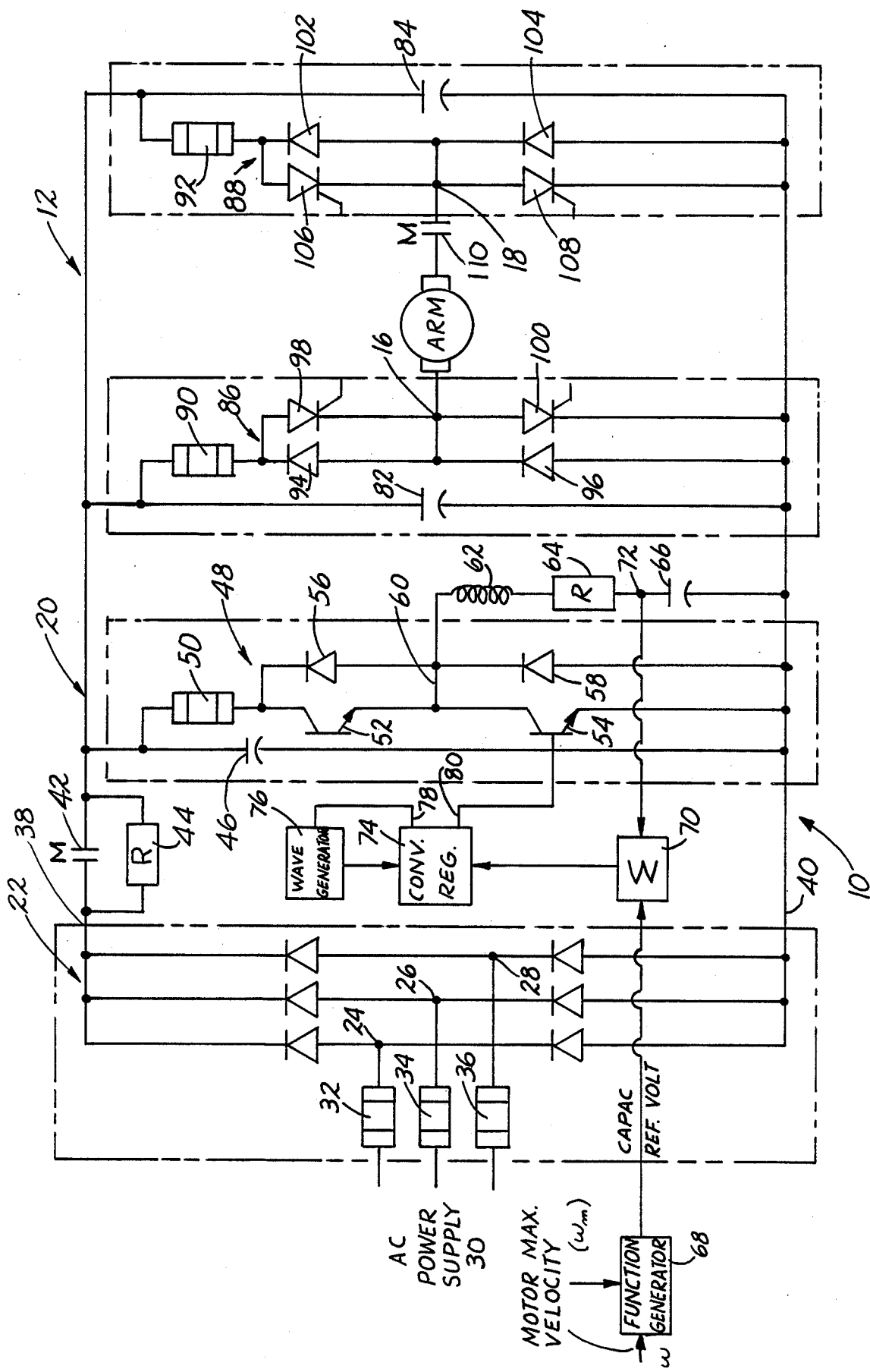

ENERGY RECOVERY SYSTEM FOR CYCLIC DRIVES

This is a continuation of co-pending application Ser. No. 669,946 filed on Nov. 9, 1984, now abandoned.

TECHNICAL FIELD

This invention generally relates to a system for recovering energy which is usually lost in an electrical motor drive having a cyclic load, and more particularly to a system for recovering the energy generated by an electrical motor when it is decelerating under a cyclic load and providing for its subsequent reuse when the drive requires acceleration of the motor.

BACKGROUND ART

Electrical motor drive systems having a cyclic load which require energy to be cycled into and out of the load are common in industrial applications. An example of such a system is a cut-to-length mechanism which involves the acceleration of the cutting mechanism from rest up to a speed matching that of a moving web in order to cut the web cleanly, and the subsequent deceleration of the cutting mechanism to rest awaiting the next cut. Such cutting mechanisms are generally massive in size, and the energy transferred into and out of the cutting mechanism during the cyclic accelerations and decelerations of the cutting mechanism is very substantial. Because of this, the total power required by the drive system is determined primarily by the power required to accelerate the cutting mechanism from rest; the power required for the cutting operation being relatively small in comparison.

Drive systems for applications such as the foregoing application typically are designed to regenerate the load energy to the power line during deceleration, utilizing well know techniques such as phase controlled rectifiers operating in an inverting mode. Even though the regeneration of power to the power line does conserve a substantial portion of the energy, it transfers this energy at a high power level and, typically, at a very poor average power factor. Because of this, the peak KVA demand on the power system, including the power lines, transformers and switchgear is very high relative to the average KW requirements. This results in increased costs to the user since the power handling devices are sized to handle the peak KVA requirements. In addition, many electric utility companies impose penalty charges based upon peak KVA demand.

Because of the foregoing, it has become desirable to develop an electric motor drive system wherein the energy generated by a cyclic load is utilized within the system so that the power requirements, as seen by the power lines, reflect only the average net power required by the load.

SUMMARY OF THE INVENTION

The present invention solves the aforementioned problems associated with the prior art systems as well as other problems by providing a capacitor for storing the energy produced during the voltage regeneration process of the motor drive. A two-quadrant regulator is provided between a three phase rectifier, which converts the AC input to a DC voltage, and a four-quadrant SCR regulator which controls the application of the resulting DC voltage to a DC motor. The two-quadrant regulator controls the charging and discharging of the capacitor so that the energy stored therein is proportional to the difference between the maximum rotational kinetic energy of the motor and load and the instantaneous rotational kinetic energy of the motor and load. The two-quadrant regulator permits the motor to charge the capacitor with the energy produced during motor deceleration and allows this stored energy to be utilized during subsequent motor acceleration. By using the energy so generated, the power requirements of the system are determined only by the net power required by the load.

BRIEF DESCRIPTION OF THE DRAWINGS

The single FIGURE of the drawing is an electrical schematic of the invention of this disclosure.

DESCRIPTION OF THE PREFERRED EMBODIMENT

Referring now to the drawing where the illustration is for the purpose of describing the preferred embodiment of the present invention and is not intended to limit the invention hereto, the FIGURE is an electrical schematic of the circuitry 10 utilized by this invention. In the FIGURE, reference numeral 12 refers to a four-quadrant SCR regulator which supplies power to a DC motor 14 connected across the output terminals 16, 18 of this regulator 12, reference numeral 20 refers to a two-quadrant regulator, and reference numeral 22 refers to a three phase rectifier which converts the applied AC input voltage to a DC voltage for subsequent application to the motor 14 via the regulator 12. It should be noted that even though a DC motor 14 is illustrated, an AC motor can be utilized by replacing the four-quadrant SCR regulator 12 with a controlled variable frequency DC/AC inverter. Either type of drive has the ability to regenerate power to the power lines, or to transmit power from the power lines to the load in accordance with the load torque and speed requirements. While the detailed description which follows is based upon the use of a DC motor and a four-quadrant SCR regulator 12, it is understood that the same principles apply to AC motor drives utilizing inverters capable of operating from a fixed voltage DC input, such as inverters utilizing pulse width modulation control techniques.

The AC input terminals 24, 26, 28 to the three phase rectifier 22 are connected to a three phase AC power supply 30 via fuses 32, 34 and 36, respectively. The output of the rectifier 22 is connected to a positive voltage bus 38 and to a negative voltage bus 40. The positive bus 38 is connected to one side of the two-quadrant regulator 20 via a motor starter contact 42, and the negative voltage bus 40 is connected to the other side of this regulator 20. A resistor 44 is connected in parallel across the motor starter contact 42 and is used for arc suppression and to limit the charging current to ripple smoothing capacitors 46, 82 and 84.

The two-quadrant regulator 20 is comprised of the ripple smoothing capacitor 46 connected across the positive and negative voltage buses 38, 40, and a switching network, shown generally by the reference numeral 48, connected to the positive voltage bus 38, via a fuse 50, and to the negative voltage bus 40. The switching network 48 is comprised of power transistor 52, 54 and complementary diodes 56, 58. The transistor 52 and the diode 56 are connected in a "back-to-back" relationship, i.e., the collector and the emitter of the transistor 52 are connected to the cathode and the anode of the diode 56, respectively. Similarly, the transistor 54 and the diode 58 are connected in a "back-to-back" relationship in that the collector and the emitter of the transistor 54 are connected to the cathode and the anode of the diode 58, respectively. The emitter of the transistor 52, the collector of the transistor 54, the anode of the diode 56, and the cathode of the transistor 58 are interconnected at a junction point 60. The collector of the transistor 52 and the cathode of the diode 56 are connected to the fuse 50 which, in turn, is connected to the positive voltage bus 38. The emitter of the transistor 54 and the anode of the diode 58 are connected to the negative voltage bus 40. It should be noted that the transistors 52, 54 could be replaced by other controlled devices, such as thyristors, field effect transistors or gate turn off (GTO) devices, without affecting the operation of the system. A series circuit comprising an inductance 62, a resistor 64 and a storage capacitor 66 is connected between junction point 60 and the negative voltage bus 40. This series circuit is the electrical equivalent of the motor 14.

A function generator 68 is provided having inputs proportional to the instantaneous motor and load velocity ($\omega$) and the maximum value of the motor and load velocity ($\omega_m$). The function generator 68 performs the necessary operations, hereinafter explained, to produce an output signal representative of the desired voltage of the capacitor 66. This output signal is applied as an input to a summing circuit 70, whose other input is the actual voltage of the capacitor 66 taken at junction point 72 located between the capacitor 66 and the resistor 64. The output signal produced by the summing circuit 70, which represents the difference between the desired voltage and the actual voltage of the capacitor 66, is used as a modulating input signal to a converter regulator 74. The other input signal to the cnverter regulator 74 is a triangular wave produced by a wave generator 76. The output terminals 78, 80 of the converter regulator 74 are connected to the bases of the transistors 52 and 54, respectively.

The four-quadrant SCR regulator 12 is comprised of the ripple smoothing capacitors 82, 84 connected across the positive and negative voltage buses 38, 40, and switching networks, shown generally by the reference numerals 86, 88, connected to the positive voltage bus 38 via fuses 90, 92, respectively, and to the negative voltage bus 40. The switching network 86 is comprised of diodes 94, 96 and silicon controlled rectifiers 98, 100. Similarly, the switching network 88 is comprised of diodes 102, 104, and silicon controlled rectifiers 106, 108. As in the two-quadrant regulator 20, the diodes and the SCR's in the four-quadrant SCR regulator 12 are connected in a "back-to-back" relationship in that the cathode and the anode of the diode 94 are respectively connected to the anode and the cathode of the SCR 98, the cathode and the anode of the diode 96 are respectively connected to the anode and the cathode of SCR 100, the cathode and the anode of the diode 102 are respectively connected to the anode and the cathode of the SCR 106, and the cathode and the anode of the diode 104 are respectively connected to the anode and the cathode of the SCR 108. The anodes of the diode 94 and the SCR 100 and the cathode of the diode 96 and the SCR 98 are interconnected to form the output terminal 16 of the SCR regulator 12. Similarly, the anodes of the diode 102 and the SCR 108 and the cathode of the diode 104 and the SCR 106 are interconnected to form the output terminal 18 of the regulator 12. As previously stated, the DC motor 14 is connected across the output terminals 16, 18 of the SCR regulator 12. It should be noted that a motor starter contact 110 is connected between the output terminal 18 and the armature winding of the motor 14 to provide protection for same.

The principle upon which the invention is based is that the electrical energy stored in a capacitor may be converted into mechanical kinetic energy stored in a mass moving at a certain velocity, and vice versa. The kinetic energy stored in a moving mass can be expressed as follows:

$$KE = \tfrac{1}{2} M_{TM}^2 \text{ (for linear motion)} \tag{1}$$

$$KE = \tfrac{1}{2} J\omega^2 \text{ (for rotational motion)} \tag{2}$$

As for the energy stored in a capacitor, this energy can be expressed as follows:

$$Q = \tfrac{1}{2} CE^2 \tag{3}$$

where E represents the voltage to which the capacitor has been charged. If such electrical energy is converted into mechanical kinetic energy in a closed system, or vice versa, and this conversion is complete, it can be shown that such a conversion adheres to the following relationship:

$$\tfrac{1}{2} CE^2 = \tfrac{1}{2} J\omega^2 \tag{4}$$

The maximum value of rotational kinetic energy in an electric motor drive system is a function of the mass of the drive motor and its connected load and the maximum angular velocity attained during system operation, both of these parameters being known for any specific application. Similarly, the maximum value of energy in a storage capacitor is a function of the size of the capacitor and the voltage level to which it has been charged. In the motor drive system of this invention, the maximum voltage to which the storage capacitor 66 can be charged is the voltage level of positive voltage bus 38. For the foregoing conversion of rotational kinetic energy to electrical energy, it follows that the capacitor 66 must be sized so as to the capable of storing the maximum load energy. Thus, its size can be determined as follows:

$$C = K_P \frac{J\omega_m^2}{E^2} \tag{5}$$

where:
K$_P$ is a proportionality constant
J=moment of inertia of motor and load
$\omega_m$=maximum angular velocity
E=DC bus voltage.

However, the actual operation of the motor drive system requires controlling the voltage level of the capacitor 66 relative to the angular velocity of the motor and the load on an instantaneous basis such that the following relationship is maintained:

$$\frac{K_P}{2} CE^2 + \tfrac{1}{2} J\omega^2 + \tfrac{1}{2} J\omega_m^2 \tag{6}$$

where:
K$_P$ is a proportionality constant chosen to relate electrical potential energy to mechanical kinetic energy.
C=capacitance of energy storage capacitor E = capacitor instantaneous terminal voltage
J = moment of inertia of motor and load
ω = instantaneous angular velocity of motor and load
$\omega_m$ = maximum angular velocity of motor and load If this equation is solved for E (capacitor instantaneous terminal voltage), the following relationship results:

$$E = \sqrt{\frac{J}{KpC}(\omega_m^2 - \omega^2)} \quad (7)$$

If the voltage level of the capacitor 66 is controlled according to the latter equation, for any particular angular velocity of the motor and the load, the amount of energy stored in the capacitor will be proportional to the difference between the maximum attainable rotational kinetic energy for the motor and load and the instantaneous rotational kinetic energy for motor and the load. Thus, the capacitor 66 can supply the additional energy requirements of the motor and the load if the angular velocity of the motor and the load are increased to the maximum specified for same. Furthermore, since the capacitor 66 is sized so as to be capable of storing the maximum kinetic energy for the motor and load, it can readily absorb the total instantaneous value of rotational kinetic energy contained in the motor and load during deceleration of same.

The voltage level of the capacitor 66 is controlled according to the latter equation, i.e., the amount of energy stored in the capacitor 66 is proportional to the difference between the maximum attainable rotational kinetic energy for the motor and load and the instantaneous rotational kinetic energy for the motor and the load, by means of the circuitry 10 illustrated in the FIGURE. Referring to this FIGURE, it can be seen that junction point 60 can be instantaneously connected to either the positive voltage bus 38 or the negative voltage bus 40 by alternately turning on either transistor 52 or 54. If transistors 52 and 54 are switched on and off by a modulating controller, such as converter regulator 74, such that junction point 60 is alternatively connected to the positive voltage bus 38 or the negative voltage bus 40 at a relatively high frequency, and if the time periods for turn on of the transistors 52 and 54 are made substantially equal, then the actual voltage of junction point 60 with respect to the negative voltage bus 40 will be a square wave having an amplitude equal to the voltage of the positive voltage bus 38 and having an average voltage of one-half (½) of the voltage of the positive voltage bus 38. By varying the duty cycle of the modulation such that the "on time" of the transistor 52 is greater than the "on time" of the transistor 54, the average voltage of junction point 60 will increase and approach the voltage of the positive voltage bus 38. Conversely, decreasing the "on time" of the transistor 52 relative to the "on time" of the transistor 54 causes the average voltage of the junction point 60 to decrease and approach zero. In this manner, the voltage of the junction point 60 and the voltage applied to the capacitor 66 can be controlled. In order to limit the capacitor charging and discharging currents to a reasonable level, the inductance 62 and the resistor 64 are utilized for peak current control and load damping. As long as the system is operating with a constant average voltage across the capacitor 66, the action of the two-quadrant regulator 20 will produce only an alternating ripple current through the regulator 20 and the capacitor 66 with no steady state DC current component. The value of the ripple current will be a function of the modulation frequency and the values of the inductance 62 and the resistor 64. However, when the voltage of the junction point 60 is increased relative to the voltage of the capacitor 66, such increase being accomplished by changing the modulation duty cycle, then a DC charging current must flow into the capacitor 66 in addition to the ripple current. Conversely, when the voltage of the junction point 60 is decreased relative to the voltage of the capacitor 66, then a DC discharging current must flow out of the capacitor 66. For example, when the voltage of junction point 60 is greater than the voltage of the capacitor 66 and transistor 52 is on, a DC charging current is drawn from the positive voltage bus 38 through transistor 52, inductance 62, resistor 64 to the capacitor 66. When the same condition exists and transistor 54, rather than transistor 52, is on, the voltage across the inductance 62 drives a DC charging current through the inductance 62, resistor 64, capacitor 66, and the diode 58. Conversely, when the voltage of the junction point 60 is less than the voltage of the capacitor 66 and transistor 54 is on, the voltage across the capacitor 66 drives a DC discharging current through the capacitor 66, resistor 64, inductance 62 and transistor 54. When the same condition exists and transistor 52, rather than transistor 54, is on, the voltage across the inductance 62 drives a DC discharging current through the capacitor 66, resistor 64, inductance 62, diode 56 into the positive voltage bus 38. From the last example, it can be seen that even though the voltage of the capacitor 66 is less than the voltage of the positive voltage bus 38, regeneration of the capacitor energy into the bus 38 can occur due to the switching action and the voltage developed across the inductance 62.

The converter regulator 74 performs the function of controlling the modulation cycle of the transistors 52, 54 so as to vary the average voltage of the junction point 60. It accomplishes this function by comparing the instantaneous value of the triangular wave produced by the wave generator 76 with a DC control signal produced by the summing circuit 70. This DC control signal is proportional to the difference between the desired voltage and the actual voltage of the capacitor 66. Typically, the converter regulator 74 utilizes a voltage comparator consisting of a very high gain amplifier whose output switches from minimum saturation to maximum saturation whenever the amplitude of the DC control signal exceeds the instantaneous value of the triangular wave. The average voltage of the output signal from the comparator is proportional to the difference between the desired voltage and the actual voltage of the capacitor 66 and the frequency of the output signal is equal to the frequency of the triangular wave. This output signal, suitably amplified and buffered, is selectively applied to the bases of the transistors 52 and 54 via converter regulator output terminals 78, 80 respectively to provide the foregoing modulation of the regulator 20.

As previously stated, the DC control signal produced by the summing circuit 70 is proportional to the difference between the desired voltage and the actual voltage of the capacitor 66. The desired voltage is proportional to the square root of the difference between the square of the maximum angular velocity ($\omega_m$) of the motor and load and the square of the instantaneous angular velocity ($\omega$) of the motor and load. A signal representative of the desired voltage is produced by the function generator 68 which has input signals representative of the maximum angular velocity ($\omega_m$) of the motor and load and the instantaneous angular velocity ($\omega$) of the motor and load. These input signals may be obtained by either analog or digital means. The function generator 68 performs the necessary operations (squaring of the input signals, subtracting $\omega^2$ from $\omega_m^2$, and extracting the square root of the resultant) to produce an output signal representative of the desired voltage of the capacitor 66.

In order to describe the operation of the circuitry 10, it should be assumed that a motor starter (not shown) has been energized, thus closing motor starter contacts 42 and 110. The three phase rectifier 22 is of standard design and operation, i.e., the path of conventional current through the rectifier 22 depends upon the relationship of the three incoming line voltages at a particular instant. Current flows from the most positive line through its associated diode within the rectifier 22 to the positive voltage bus 38, through the motor 14 to the negative voltage bus 40, and then through the diode associated with the most negative line. In this manner a sequence of current transfers between the diodes in the rectifier 22 occurs causing the establishment of six possible conduction paths within the rectifier during each AC cycle. The foregoing results in the maximum power output being produced from the AC power source and a resulting waveform having only a very small ripple. While the foregoing rectification is occurring, if appropriate gating signals are applied to the gates associated with SCR 98 and 108, a current conduction path is established from the positive voltage bus 38 through the fuse 90, SCR 98, motor 14, motor starter contact 110, and SCR 108 to the negative voltage bus 40 causing the armature of the motor 14 to rotate in one direction. Similarly, if the gating signals are applied to the gates associated with SCR 106 and 100 rather than to the gates associated with SCR 98 and 108, a current conduction path is established from the positive voltage bus 38 through the fuse 92, SCR 106, motor starter contact 110, motor 14 and SCR 100 to the negative voltage bus 40 causing the armature of the motor 14 to rotate in the opposite direction. Assuming that appropriate gating signals have been applied to the gates associated with SCR 98 and 108, the armature of the motor 14 will continue to rotate in one direction until the gating signals have been extinguished at which time the rotation of the motor armature will slow and will eventually stop. While the rotation of the armature is slowing, the motor 14 acts as a generator, because of the stator field, and produces a positive voltage at terminal 16 and a negative voltage at terminal 18. While this is occurring, the capacitor desired voltage reference signal, produced by the function generator 68, is increasing since the instantaneous angular velocity of the motor and load is decreasing. This causes the "error signal" produced by the summing circuit 70 and applied to the converter regulator 74 to similarly increase. The converter regulator 74, in turn, causes the duty cycle of the transistors 52 and 54 to change so that the "on time" of the transistor 52 is greater than the "time" of the transistor 54. When transistor 52 is "on" and transistor 54 is "off", current flows from the motor 14 through the diode 94, fuse 90, positive voltage bus 38, fuse 50, transistor 52, inductance 62, resistor 64, into the capacitor 66 charging same. Conversely, when transistor 54 is "on" and transistor 52 is "off", the voltage induced in the inductance 62 causes current to circulate within a loop comprising the inductance 62, resistor 64, capacitor 66 and the diode 58 charging the capacitor 66.

When the motor is subsequently accelerated, the capacitor desired voltage reference signal, produced by the function generator 68, decreases since the instantaneous angular velocity of the motor and load is increasing. This causes the "error signal" produced by the summing circuit 70 and applied to the converter regulator 74 to similarly decrease which, in turn, causes the "on time" of the transistor 54 to be greater than the "on time" of the transistor 52. In this case when transistor 52 is "on" and transistor 54 is "off", current flows from the capacitor 66 through the resistor 64, inductance 62, diode 56 into the positive voltage bus 38 discharging the capacitor 66 and assisting in supplying power to the motor. Conversely, when transistor 54 is "on" and transistor 52 is "off", the voltage across the capacitor 66 causes current to circulate within the loop comprising the capacitor 66, resistor 64, inductance 62 and transistor 54 discharging the capacitor 66. Regardless of the direction of motor rotation during deceleration or subsequent acceleration, the capacitor 66 is charged during deceleration and the resulting energy contained therein, or a portion thereof, is utilized during the subsequent acceleration of the motor and load, as just described.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A system for recovering the electrical energy produced by an electric motor during deceleration for reuse during subsequent acceleration of the motor comprising capacitance means for storing the electrical energy produced by the electric motor during deceleration, means for controlling the charging and discharging of said capacitance means permitting the amount of electrical energy stored therein to be proportional to the difference between the total maximum rotational kinetic energy of the motor and any load associated therewith and the total instantaneous rotational kinetic energy of the motor and any load associated therewith, and means for allowing the transfer of said electrical energy from said capacitance means to the motor for reuse during the subsequent acceleration of the motor, said energy transfer allowing means having a duty cycle that is varied causing the instantaneous terminal voltage of said capacitance means to be proportional to the difference between the total maximum rotational kinetic energy of the motor and any load associated therewith and the total instantaneous rotational kinetic energy of the motor and any load associated therewith.

2. The system as defined in claim 1 wherein said capacitance means is capable of storing electrical energy equal to the total maximum rotational kinetic energy of the motor and any load associated therewith.

3. A system for recovering the electrical energy produced by an electric motor during deceleration for reuse during subsequent acceleration of the motor comprising capacitance means for storing the electrical energy produced by the electric motor during deceleration, means for controlling the charging and discharging of said capacitance means permitting the amount of electrical energy stored therein to be proportional to the difference between the total maximum rotational kinetic energy of the motor and any load associated therewith and the total instantaneous rotational kinetic energy of the motor and any load associated therewith, means for allowing the transfer of said electrical energy from said capacitance means to the motor for reuse during the subsequent acceleration of the motor, said energy transfer allowing means having a duty cycle that is varied causing the instantaneous terminal voltage of said capacitance means to be proportional to the difference between the total maximum rotational kinetic energy of the motor and any load associated therewith and the total instantaneous rotational kinetic energy of the motor and any load associated therewith, means for producing a reference voltage for said capacitance means, and means for comparing said reference voltage to said instantaneous terminal voltage of said capacitance means, said comparing means producing an output signal representative of the difference between said reference voltage and said instantaneous terminal voltage of said capacitance means, said output signal being utilized to control said duty cycle of said energy transfer allowing means.

4. A system for recovering the electrical energy produced by an electric motor during deceleration or reuse during subsequent acceleration of the motor comprising capacitance means for storing the electrical energy produced by the electric motor during deceleration, means for controlling the charging and discharging of said capacitance means permitting the amount of electrical energy stored therein to be proportional to the difference between the total maximum rotational kinetic energy of the motor and any load associated therewith and the total instantaneous rotational kinetic energy of the motor and any load associated therewith, means for allowing the transfer of said electrical energy from said capacitance means to the motor for reuse during the subsequent acceleration of the motor, said energy transfer allowing means having a duty cycle that is varied causing the instantaneous terminal voltage of said capacitance means to be proportional to the difference between the total maximum rotational kinetic energy of the motor and any load associated therewith and the total instantaneous rotational kinetic energy of the motor and any load associated therewith, means for producing a reference voltage for said capacitance means, said reference voltage being proportional to the difference between the total maximum rotational kinetic energy of the motor and any load associated therewith and the total instantaneous rotational kinetic energy of the motor and any load associated therewith, and means for comparing said reference voltage to said instantaneous terminal voltage of said capacitance means, said comparing means producing an output signal representative of the difference between said reference voltage and said instantaneous terminal voltage of said capacitance means, said output signal being utilized to control said duty cycle of said energy transfer allowing means.

5. A system for recovering the electrical energy produced by an electric motor during deceleration for reuse during subsequent acceleration of the motor comprising capacitance means for storing the electrical energy produced by the electric motor during deceleration, means for controlling the charging and discharging of said capacitance means permitting the amount of electrical energy stored therein to be proportional to the difference between the total maximum rotational kinetic energy of the motor and any load associated therewith and the total instantaneous rotational kinetic energy of the motor and any load associated therewith, and means for allowing the transfer of said electrical energy from said capacitance means to the motor for reuse during the subsequent acceleration of the motor, said energy transfer allowing means comprising switching means which allows said capacitance means to receive the electrical energy produced by the motor during deceleration and permits the transfer of said electrical energy from said capacitance means to the motor for reuse during the subsequent acceleration of the motor, said switching means having a duty cycle that is varied causing the instantaneous terminal voltage of said capacitance means to be proportional to the difference between the total maximum rotational kinetic energy of the motor and any load associated therewith and the total instantaneous rotational kinetic energy of the motor and any load associated therewith.

6. A system for recovering the electrical energy produced by an electric motor during deceleration for reuse during subsequent acceleration of the motor comprising capacitance means for storing the electrical energy produced by the electric motor during deceleration, means for controlling the charging and discharging of said capacitance means permitting the amount of electrical energy stored therein to be proportional to the difference between the total maximum rotational kinetic energy of the motor and any load associated therewith and the total instantaneous rotational kinetic energy of the motor and any load associated therewith, means for allowing the transfer of said electrical energy from said capacitance means to the motor for reuse during the subsequent acceleration of the motor, said energy transfer allowing means comprising switching means which allows said capacitance means to receive the electrical energy produced by the motor during deceleration and permits the transfer of said electrical energy from said capacitance means to the motor for reuse during the subsequent acceleration of the motor, said switching means having a duty cycle that is varied causing the instantaneous terminal voltage of said capacitance means to be proportional to the difference between the total maximum rotational kinetic energy of the motor and any load associated therewith and the total instantaneous rotational kinetic energy of the motor and any load associated therewith, means for producing a reference voltage for said capacitance means, and means for comparing said reference voltage to said instantaneous terminal voltage of said capacitance means, said comparing means producing an output signal representative of the difference between said reference voltage and said instantaneous terminal voltage of said capacitance means, said output signal being utilized to control said duty cycle of said switching means.

7. A system for recovering the electrical energy produced by an electric motor during deceleration for reuse during subsequent acceleration of the motor comprising capacitance means for storing the electrical energy produced by the electric motor during deceleration, means for controlling the charging and discharging of said capacitance means permitting the amount of electrical energy stored therein to be proportional to the difference between the total maximum rotational kinetic energy of the motor and any load associated therewith and the instantaneous rotational kinetic energy of the motor and any load associated therewith, means for allowing the transfer of said electrical energy from said capacitance means to the motor for reuse during the subsequent acceleration of the motor, said energy transfer allowing means comprising switching means which allows said capacitance means to receive the electrical energy produced by the motor during deceleration and permits the transfer of said electrical energy from said capacitance means to the motor for reuse during the subsequent acceleration of the motor, said switching means having a duty cycle that is varied causing the instantaneous terminal voltage of said capacitance means to be proportional to the difference between the total maximum rotational kinetic energy of the motor and any load associated therewith and the total instantaneous rotational kinetic energy of the motor and any load associated therewith, means for producing a reference voltage for said capacitance means, said reference voltage being proportional to the difference between the total maximum rotational kinetic energy of the motor and any load associated therewith and the instantaneous rotational kinetic energy of the motor and any load associated therewith, and means for comparing said reference voltage to said instantaneous terminal voltage of said capacitance means, said comparing means producing an output signal representative of the difference between said reference voltage and said instantaneous terminal voltage of said capacitance means, said output signal being utilized to control said duty cycle of said switching means.

8. A system for recovering the electrical energy produced by an electric motor during deceleration for reuse during subsequent acceleration of the motor comprising capacitance means for storing the electrical energy produced by the electric motor during deceleration, an inductance and a resistance electrically connected to said capacitance means, said inductance, resistance and capacitance means having electrical properties approximating the electrical properties of the motor, means for controlling the charging and discharging of said capacitance means permitting the amount of electrical energy stored therein to be proportional to the difference between the total maximum rotational kinetic energy of the motor and any load associated therewith and the total instantaneous rotational kinetic energy of the motor and any load associated therewith, and means for allowing the transfer of said electrical energy from said capacitance means to the motor for reuse during the subsequent acceleration of the motor.

* * * * *